(No Model.)
R. T. CRANE.
VALVE SEAT.
No. 546,066. Patented Sept. 10, 1895.
Fig A.
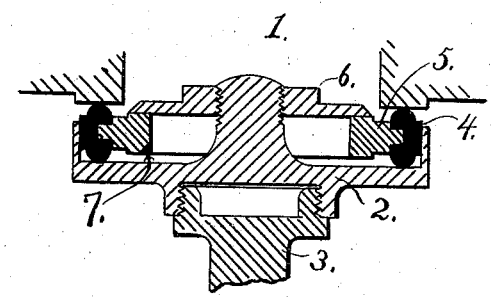
Fig B.
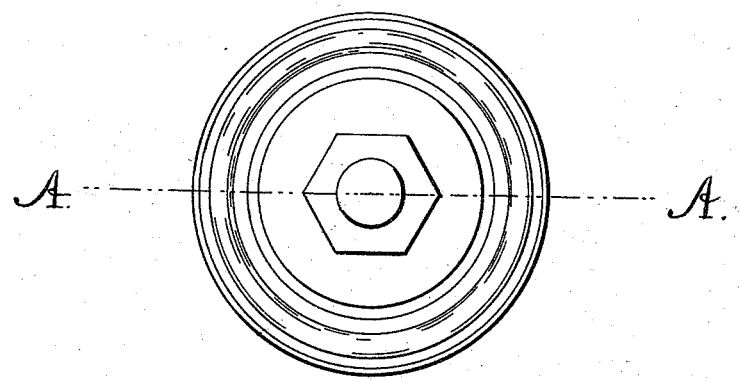
Witnesses
W. W. Garrard
C. C. J. Wayman
Richard T. Crane Inventor
By his Attorney Paul Synnestvedt.

UNITED STATES PATENT OFFICE.

RICHARD T. CRANE, OF CHICAGO, ILLINOIS, ASSIGNOR TO THE CRANE COMPANY, OF SAME PLACE.

VALVE-SEAT.

SPECIFICATION forming part of Letters Patent No. 546,066, dated September 10, 1895.

Application filed December 3, 1894. Serial No. 530,703. - (No model.)

*To all whom it may concern:*

Be it known that I, RICHARD T. CRANE, a citizen of the United States, residing at Chicago, in the county of Cook and State of Illinois, have invented a new and useful Improvement in Valve-Seats, of which the following is a specification.

My invention relates to that class of valves of which the so-called "globe valve" is perhaps the best known example.

The object of my invention, broadly stated, is to provide a valve with a seat which, while retaining the compressibility and consequent tightness of a soft-metal bearing-face, will still possess the firmness and to a certain extent the cheapness of a hard-metal disk.

More specifically my invention consists in the combination, in a valve-seat, of a soft-metal bearing-face with a hard-metal body or backing to form a ring which will not only be cheaper to make than a seat-ring composed entirely of soft metal, but will also retain its shape better when heavily compressed.

A further object of my invention is to so construct the ring described as to permit of its reversal (when one bearing-face gets worn) with the greatest facility possible and without the necessity of injuring or destroying the seat-ring itself.

To better understand my invention, reference may be had to the accompanying drawings, in which—

Figure A represents a section through the center of a disk provided with my improved seat, said section being taken on the line A A of Fig. B. Fig. B is a plan view of the face side of the disk and seat-ring shown in section in Fig. A.

In Fig. A, 1 is an opening or port through a valve. 2 is the casing, which together with the ring forms the disk of the valve. 3 is the end of a spindle or stem provided for the purpose of moving the disk. 4 is the soft-metal part of the ring. 5 is the hard-metal body, and 6 is a threaded nut for holding the seat-ring in place. In the manufacture of the ring 4 5 the hard-metal part 5 is cast first (preferably of the shape shown in the cut) and the soft-metal part is afterward cast or otherwise formed around it.

To facilitate the removal of the ring when it is to be reversed or renewed, I provide a notch or notches in the inner corners of the ring, into which a tool may be inserted for that purpose. At 7 I have indicated one such notch, but more may of course be used, if desired, and they may be of any shape preferred, such detail of construction being comparatively immaterial.

It will be obvious that the essential elements of my invention are applicable to many different forms of valve, and I therefore do not desire to limit myself to the precise construction shown, but wish it understood that such construction is merely representative of the form which to me seems best in practice.

What I claim as new, and desire to secure by Letters Patent, is—

In a valve seat or disk, the combination of, a seat ring case; a reversible seat ring, having a soft metal bearing face combined with a hard metal body, and adapted to rest in said case; and a nut for holding the seat ring in place, substantially as described.

RICHARD T. CRANE.

Witnesses:
W. W. GARRARD,
C. R. SMITH.